United States Patent
Morris et al.

(10) Patent No.: US 8,409,677 B2
(45) Date of Patent: *Apr. 2, 2013

(54) BIODEGRADABLE STARCH-CONTAINING BLEND

(75) Inventors: Barry Alan Morris, Wilmington, DE (US); Edward J Stancik, Diamondhead, MS (US); Mark F Teasley, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/004,155

(22) Filed: Jan. 11, 2011

(65) Prior Publication Data

US 2011/0177275 A1 Jul. 21, 2011

Related U.S. Application Data

(60) Provisional application No. 61/296,766, filed on Jan. 20, 2010.

(51) Int. Cl.
*B29D 22/00* (2006.01)
*B29D 23/00* (2006.01)
*B32B 1/08* (2006.01)

(52) U.S. Cl. ........ 428/35.7; 428/36.9; 428/480; 524/47; 528/302; 525/444

(58) Field of Classification Search .................. 428/35.7, 428/36.9, 480; 524/47; 528/302; 525/444
See application file for complete search history.

(56) References Cited

U.S. PATENT DOCUMENTS

| | | | |
|---|---|---|---|
| 5,043,196 | A | 8/1991 | Lacourse |
| 5,314,754 | A | 5/1994 | Knight |
| 5,322,866 | A | 6/1994 | Mayer |
| 5,374,304 | A | 12/1994 | Frische |
| 6,235,815 | B1 | 5/2001 | Loercks |
| 6,258,924 | B1 | 7/2001 | Warzelhan et al. |
| 6,348,524 | B2 | 2/2002 | Bastioli et al. |
| 6,472,497 | B2 | 10/2002 | Loercks |
| 6,962,950 | B1 | 11/2005 | Bastioli |
| 7,176,251 | B1 | 2/2007 | Bastioli |
| 7,326,743 | B2 | 2/2008 | Yu |
| 2003/0187149 | A1 | 10/2003 | Schmidt |
| 2007/0241483 | A1 | 10/2007 | Bastioli |
| 2008/0038496 | A1 | 2/2008 | Bastioli |
| 2009/0123767 | A1 | 5/2009 | Gohil |
| 2009/0324917 | A1 | 12/2009 | Wang et al. |
| 2011/0213056 | A1 * | 9/2011 | Hasty et al. ..................... 524/47 |

FOREIGN PATENT DOCUMENTS

| | | |
|---|---|---|
| DE | 4440837 A1 | 5/1996 |
| EP | 0349960 A2 | 1/1990 |
| WO | 2008014573 A1 | 2/2008 |
| WO | 2010075023 A1 | 7/2010 |
| WO | 2010077804 A1 | 7/2010 |

* cited by examiner

*Primary Examiner* — Michael C Miggins

(57) ABSTRACT

Disclosed is a composition comprising an aliphatic-aromatic copolyester consisting essentially of a dicarboxylic acid component that includes a terephthalic acid component and a linear aliphatic dicarboxylic acid component, a glycol component consisting essentially of a linear aliphatic glycol component and 0 to 4 mole percent based on 100 mole percent total glycol component of a dialkylene glycol component and at least one additional component; starch; water; and polyol plasticizer. Also described are shaped articles such as films which exhibit greater than expected tear strength and methods for preparing the films.

16 Claims, No Drawings

BIODEGRADABLE STARCH-CONTAINING BLEND

This application claims priority to U.S. provisional application Ser. No. 61/296,766, filed Jan. 20, 2010; the entire disclosure of which is incorporated herein by reference.

This invention relates to a biodegradable composition comprising a compostable copolyester and starch, and articles prepared from the composition. The invention also relates to a method for improving tear strength of films comprising copolyesters.

BACKGROUND

Packaging materials are increasingly being scrutinized as contributors to litter and other sustainability issues. One solution is to make packaging out of compostable materials. A number of biodegradable starch-containing materials have been developed recently.

Starch-containing compositions have been used to provide biodegradable resin compositions useful for manufacture of shaped articles such as rigid sheet, flexible film, or molded articles (see, for example, U.S. Pat. Nos. 5,043,196, 5,314,754, 5,322,866, 5,374,304, and 7,326,743 and WO 08/014,573, which describe starch compounded into various water soluble polymers). "Thermoplastic starch" compositions using biodegradable polymers as melting aids have been disclosed in U.S. Pat. Nos. 6,235,815 and 6,472,497 and US patent application US2003/0187149. Other starch-containing compositions include those described in U.S. Patent Application Ser. No. 61/254,951.

There is a sizable market for compostable trash bags, shopping bags and the like that is currently served by blends of starch and compostable polyesters. The predominant compostable water-insoluble polyester is a copolymer of 1,4-butanediol, terephthalic acid and adipic acid (PBAT), all derived from petroleum sources. PBAT polymers are commercially available under the tradename ECOFLEX® from BASF. Thermoplastic starch compositions have been made from PBAT by compounding the polymer with starch, glycerol and water, as taught in U.S. Pat. Nos. 6,348,524, 6,962,950, 7,176,251, and published patent applications US20070241483(A1) and US200838496(A1).

An even more sustainable approach is to derive the compostable polyester copolymer from one or more bio-sourced monomers. This would significantly reduce the environmental footprint (non-renewable energy consumption and greenhouse gas emissions) of the bag.

For example, E. I. du Pont de Nemours and Company ("DuPont") has recently developed aliphatic-aromatic copolyesters based on bio-sourced 1,3-propanediol (PDO), including copolymers derived from copolymerization of bio-PDO, terephthalic acid (petroleum sourced) and sebacic acid (bio-sourced from castor beans) that comprise over 50% bio-sourced components (See International Application Numbers PCT/US09/67875 and PCT/US09/67863 and US Patent Application Publication 2009/0123767).

While these 1,3-propanediol-terephthalate-sebacic acid compositions closely match the thermal and compostability properties of commercially-available PBAT, they fall short in tensile and mechanical properties and in particular tear strength, a key requirement for films. In addition, blown films made from these polymers exhibit anisotropy in tear strength: the tear resistance in the machine direction is substantially less than in the transverse direction. PBAT films have more balanced tear strength.

Adding additional monomers, such as phthalic anhydride, can improve tear strength (See International Application Numbers PCT/US09/67831, PCT/US09/67838 and PCT/US09/67850). But these copolymers also exhibit anisotropic tear resistance in blown films.

It is desirable to obtain additional compostable compositions that are sourced from biological sources instead of petroleum sources that provide good tensile and mechanical properties for articles made from the compositions. One such mechanical property is tear strength, which is important for many packaging film applications, including biodegradable trash bags.

SUMMARY OF THE INVENTION

The invention is directed to a composition comprising, or consisting essentially of, based on the weight of the composition, 40 to 70 weight % of an aliphatic-aromatic copolyester, 20 to 50 weight % of starch, 5 to 10 weight % of polyol plasticizer, and 0 to 10 weight % of water wherein the aliphatic-aromatic copolyester comprises or consists essentially of a dicarboxylic acid component, a glycol component, and optionally 0 to about 150 mole percent of a branched hydroxy-carboxylic acid component;

the dicarboxylic acid component comprises or consists essentially of, based on 100 mole percent total acid component, about 80 to 40 mole percent of a first aromatic dicarboxylic acid consisting essentially of a terephthalic acid component, about 10 to 60 mole percent of a linear aliphatic dicarboxylic acid component; and optionally 0 to 30 mole percent of an additional dicarboxylic acid component;

the additional dicarboxylic acid component is selected from the group consisting of a second aromatic dicarboxylic acid component other than a terephthalic acid component, an alicyclic dicarboxylic acid component, and a branched dicarboxylic acid component;

the glycol component consists essentially of, based on 100 mole percent total glycol component, about 100 to 60 mole percent of a linear aliphatic glycol component, 0 to about 4 mole percent of a dialkylene glycol component; and 0 to 40 mole percent of an additional glycol;

the additional glycol component is selected from the group consisting of an alicyclic glycol component and a branched glycol component; and the sum of the additional dicarboxylic acid component, the additional glycol component, and the branched hydroxy-carboxylic acid component is at least 2 mole %.

The invention also provides a method for preparing a film comprising the copolyester described above; the method comprising (1) melt blending the copolyester with starch, water and polyol plasticizer to provide a blended composition and (2) preparing a film comprising the blended composition by blown film extrusion wherein the film comprising the blended composition has a tear strength measured in the machine direction at least 3 times greater that the tear strength measured in the machine direction of a film made from the copolyester.

The invention also provides an article prepared from the composition described above.

DETAILED DESCRIPTION OF THE INVENTION

All references, patents and publications, cited in this description to more fully describe the state of the art to which this invention pertains are incorporated by reference.

When a component is listed as "optional" it may or may not be present (that is, the amount of the component is 0). When an optional component is present, it may be present in any non-zero amount such as at least 0.1 weight % or 0.1 mole %.

The composition described herein can be processed into films with enhanced tear strength that are compostable. Biodegradable copolyesters have previously been blended with starch to provide compostable resins. Adding starch to such copolyesters increases the tear strength of a film prepared from the copolyester/starch blend compared to a film prepared from the copolyester that is not blended with starch. Surprisingly, the addition of starch increased the tear strength of a film comprising a blend comprising starch and an aromatic/aliphatic copolymer described herein substantially more than a film comprising a PBAT/starch blend compared to films prepared from the non-starch-containing copolymers.

The Copolyester

The composition includes an aliphatic-aromatic copolyester, which is typically semicrystalline and biodegradable. The copolyesters useful in the composition are prepared via the copolymerization of terephthalic acid, a linear aliphatic dicarboxylic acid and optionally a second aromatic dicarboxylic acid, an alicyclic dicarboxylic acid and/or a branched dicarboxylic acid component with a linear aliphatic glycol, and optionally an alicyclic glycol and/or a branched glycol component; and optionally a branched hydroxy-carboxylic acid component.

Note that the ester-forming derivatives of the acids may be used. The terms "diol" and "glycol" are used interchangeably to refer to general compositions of a primary, secondary, or tertiary alcohol containing two hydroxyl groups. The term "semicrystalline" is intended to indicate that some fraction of the polymer chains of the aromatic-aliphatic copolyesters reside in a crystalline phase with the remaining fraction of the polymer chains residing in a non-ordered glassy amorphous phase. The crystalline phase is characterized by a melting temperature, Tm, and the amorphous phase by a glass transition temperature, Tg, which can be measured using Differential Scanning calorimetry (DSC).

The term alicyclic glycol is intended to include all non-linear aliphatic glycols containing rings of carbon atoms linked by single bonds. The term alicyclic dicarboxylic acid is intended to include all non-linear aliphatic dicarboxylic acids containing rings of carbon atoms linked by single bonds.

The dicarboxylic acid component of the copolyester may consist essentially of between about 80 and 40 mole percent of a terephthalic acid component, between about 10 and 60 mole percent of a linear aliphatic dicarboxylic acid component, and optionally 0 to about 30 mole percent of an additional dicarboxylic acid component selected from the group consisting of aromatic dicarboxylic acid components other than a terephthalic acid component, alicyclic dicarboxylic acid components, and branched dicarboxylic acid components, all of which are based on 100 mole percent of total dicarboxylic acid component.

Terephthalic acid components that are useful in the aliphatic-aromatic copolyesters include terephthalic acid, bis(glycolates) of terephthalic acid, and lower alkyl esters of terephthalic acid having 8 to 20 carbon atoms. Specific examples of desirable terephthalic acid components include terephthalic acid, dimethyl terephthalate, bis(2-hydroxyethyl)terephthalate, bis(3-hydroxypropyl) terephthalate, bis(4-hydroxybutyl)terephthalate.

Linear aliphatic dicarboxylic acid components that are useful in the aliphatic-aromatic copolyesters include unsubstituted and methyl-substituted aliphatic dicarboxylic acids and their lower alkyl esters having from 2 to 36 carbon atoms, or from 7 to 36 carbon atoms, or from 7 to 24 carbon atoms or from 7 to 16 carbon atoms, preferably from 8 to 36 carbon atoms or from 8 to 24 carbon atoms, or from 8 to 16 carbon atoms, and their lower ($C_1$ to $C_6$) alkyl esters. Specific examples of desirable linear aliphatic dicarboxylic acid components include oxalic acid, dimethyl oxalate, malonic acid, dimethyl malonate, succinic acid, dimethyl succinate, glutaric acid, dimethyl glutarate, 3,3-dimethylglutaric acid, adipic acid, dimethyl adipate, pimelic acid, suberic acid, azelaic acid, dimethyl azelate, sebacic acid, dimethyl sebacate, undecanedioic acid, 1,10-decanedicarboxylic acid, 1,11-undecanedicarboxylic acid (brassylic acid), 1,12-dodecanedicarboxylic acid, hexadecanedioic acid, docosanedioic acid, tetracosanedioic acid, and mixtures derived therefrom. Preferably, the linear aliphatic dicarboxylic acid component is selected from the group consisting of azelaic acid, sebacic acid, and brassylic acid and their corresponding lower alkyl esters, more preferably sebacic acid and its lower alkyl esters. Preferably the azelaic acid, sebacic acid or brassylic acid is derived from a renewable biological source. However, essentially any linear aliphatic dicarboxylic acid within the limits of the carbon count defined above or known ester-forming derivative can be used, including mixtures thereof.

Optionally, a second aromatic dicarboxylate component other than a terephthalic acid component may be included in the copolyester. Aromatic dicarboxylic acid components useful in the aliphatic-aromatic copolyesters include unsubstituted and methyl-substituted aromatic dicarboxylic acids, bis(glycolates) of aromatic dicarboxylic acids, and lower alkyl esters of aromatic dicarboxylic acids having from 8 carbons to 20 carbons. Examples of desirable dicarboxylic acid components include those derived from phthalates, isophthalates, naphthalates and bibenzoates. Specific examples of desirable second aromatic dicarboxylic acid component include phthalic acid, dimethyl phthalate, phthalic anhydride, bis(2-hydroxyethyl)phthalate, bis(3-hydroxypropyl)phthalate, bis(4-hydroxybutyl)phthalate, isophthalic acid, dimethyl isophthalate, bis(2-hydroxyethyl)isophthalate, bis(3-hydroxypropyl)isophthalate, bis(4-hydroxybutyl) isophthalate, 2,6-naphthalene dicarboxylic acid, dimethyl-2,6-naphthalate, 2,7-naphthalenedicarboxylic acid, dimethyl-2,7-naphthalate, 1,8-naphthalene dicarboxylic acid, dimethyl 1,8-naphthalenedicarboxylate, 1,8-naphthalic anhydride, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylenaphthalenezoic acid), dimethyl-4,4'-methylenebis(benzoate), biphenyl-4,4'-dicarboxylic acid and mixtures derived therefrom.

Other second aromatic dicarboxylic acid components include sulfonated components containing a sulfonate salt group attached to an aromatic dicarboxylic acid to provide a sulfonated aliphatic-aromatic copolyester. Exemplary aromatic nuclei that can be present in the sulfonated aromatic dicaraboxylic acid include benzene, naphthalene, diphenyl, oxydiphenyl, sulfonyldiphenyl, and methylenediphenyl. Preferably, the sulfonate component is the residue of a sulfonate-substituted phthalic acid, terephthalic acid, isophthalic acid, or 2,6-naphthalenedicarboxylic acid. More preferably, the sulfonate component is a metal salt of 5-sulfoisophthalic acid or a lower alkyl ester of 5-sulfoisophthalate. The metal salt can be selected from monovalent or polyvalent alkali metal ions, alkaline earth metal ions, or other metal ions. Preferred alkali metal ions include sodium, potassium and lithium. However, alkaline earth metals such as magnesium are also useful. Other useful metal ions include the transition metal ions, such as zinc, cobalt or iron. Multivalent metal ions are useful, for example, when an increased viscosity of the sulfonated aliphatic-aromatic copolyesters is desired.

The aliphatic-aromatic copolyesters may contain from 0.1 to 5 mole percent, or from 0.1 to 4 mole percent of sulfonate groups. While it is not intended that the invention be bound by any particular theory, it is believed that the presence of the sulfonate groups enhances the biodegradation rates of the copolyesters.

Notably, the second aromatic dicarboxylic acid component is derived from phthalic anhydride, phthalic acid, isophthalic acid, or mixtures thereof. However, any aromatic dicarboxylic acid or derivative known in the art can be used for the second aromatic dicarboxylic acid component, including mixtures thereof.

Optionally, alicyclic dicarboxylic acids may be included in the aliphatic-aromatic copolyesters. These components include alicyclic dicarboxylic acids and their lower alkyl esters having 5 to 36 carbon atoms. Specific examples include 1,4-cyclohexane dicarboxylic acid, 1,2-cyclohexane dicarboxylic acid, 1,3-cyclopentane dicarboxylic acid and (±)-1,8,8-Trimethyl-3-oxabicyclo[3.2.1]octane-2,4-dione. However, essentially any alicyclic dicarboxylic acid or derivative having 5 to 36 carbon atoms can be used, including mixtures thereof.

Branched dicarboxylic acid components are useful as optional components in the aliphatic-aromatic copolyesters. The term "branched dicarboxylic acids" is intended to include all aliphatic, alicyclic, or aromatic dicarboxylic acids that are substituted with aliphatic, alicyclic, or aromatic sidechain groups containing at least 2 carbon atoms and optionally containing oxygen atoms. The aliphatic side-chain itself may be a linear or branched aliphatic group, and the alicyclic and aromatic side-chains may be additionally substituted with these groups or methyl groups. The optional oxygen atoms can be in the form of ethers or polyethers. The sidechain groups are not intended to include long-chain branches that are generated during the course of polymerization by tri- and polyfunctional comonomers containing carboxylic acid and hydroxyl groups.

Branched dicarboxylic acid components include branched aliphatic, alicyclic, and aromatic dicarboxylic acids and their bis(glycolates) and lower alkyl esters having from 8 to 48 carbon atoms. Examples of desirable branched aliphatic dicarboxylic acid components include branched derivatives of the linear aliphatic dicarboxylic acids and dimers of unsaturated aliphatic carboxylic acids derived from renewable biological sources. Examples of desirable branched alicyclic dicarboxylic acid components include substituted derivatives of 1,4-cyclohexanedicarboxylates, 1,3-cyclohexanedicarboxylates, and 1,2-cyclohexanedicarboxylates. Examples of desirable branched aromatic dicarboxylic acid components include substituted derivatives of terephthalates, isophthalates, phthalates, naphthalates and bibenzoates.

Specific examples of desirable branched dicarboxylic acid components include 3-hexylglutaric acid, 3-phenylglutaric acid, 3,3-tetramethyleneglutaric acid, 3,3-tetramethyleneglutaric anhydride, 3-methyl-3-ethylglutaric acid, 3-tert-butyladipic acid, 3-hexyladipic acid, 3-octyladipic acid, 3-(2,4,4-trimethylpentyl)-hexanedioic acid, diethyl dibutylmalonate, 1,1-cyclohexanediacetic acid, cyclohexylsuccinic acid, 5-tert-butylisophthalic acid, 5-hexyloxyisophthalic acid, 5-octadecyloxyisophthalic acid, 5-phenoxyisophthalic acid, 2-phenoxyterephthalic acid, 2,5-biphenyldicarboxylic acid, 3,5-biphenyldicarboxylic acid, 5-tert-butyl-1,3-cyclohexanedicarboxylic acid, 5-tert-pentyl-1,3-cyclohexanedicarboxylic acid, 5-cyclohexyl-1,3-cyclohexanedicarboxylic acid, 2-cyclohexyl-1,4-cyclohexanedicarboxylic acid, fatty acid dimers, hydrogenated fatty acid dimers, and diabietic acids. Preferably, the branched dicarboxylic acid component is derived from a renewable biological source, in particular fatty acid dimers and hydrogenated fatty acid dimers. However, essentially any branched dicarboxylic acid or derivative known can be used, or as a mixture of two or more thereof.

The glycol component consists essentially of about 100 to 60 mole percent of a linear aliphatic glycol component, 0 to about 4 mole percent of a dialkylene glycol component and optionally 0 to about 40 mole percent of an additional glycol component selected from the group consisting of alicyclic glycol components and branched glycol components, all of which are based on 100 mole percent total glycol component.

Linear glycol components that are useful include unsubstituted and methyl-substituted aliphatic diols with 2 to 10 carbon atoms. Examples include 1,2-ethanediol, 1,2-propanediol, 1,3-propanediol, 2,2-dimethyl-1,3-propanediol, and 1,4-butanediol, preferably 1,2-ethanediol, 1,3-propanediol, and 1,4-butanediol, more preferably 1,3-propanediol and 1,4-butanediol, most preferably 1,3-propanediol. Preferably, the linear glycol components are derived from a renewable biological source, in particular 1,3-propanediol and 1,4-butanediol.

The 1,3-propanediol is preferably obtained biochemically from a renewable source ("biologically-derived" 1,3-propanediol). Biologically-derived 1,3-propanediol can be obtained using methods described in International Application Number PCT/US09/67863 and references therein.

The biologically-derived 1,3-propanediol, and polytrimethylene terephthalate copolyesters based thereon, may be distinguished from similar compounds produced from a petrochemical source or from fossil fuel carbon by dual carbon-isotopic finger printing as described in International Application Number PCT/US09/67863 and references therein.

Useful alicyclic glycol components include alicyclic glycols with 2 to 12 carbon atoms. Examples include isomers of cyclohexanediol, 1,2-cyclohexane dimethanol, 1,4-cyclohexane dimethanol, tricyclo[5.2.1.0$^{2,6}$]decane-4,8-dimethanol, 2,2,4,4-tetramethyl-1,3-cyclobutanediol and mixtures derived therefrom.

Branched glycol components that are useful include branched derivatives of linear aliphatic diols and dimer diols derived from unsaturated aliphatic carboxylic acids derived from renewable biological sources. Examples include 1,2-butanediol, 1,2-hexanediol, 1,2-octanediol, 1,2-decanediol, 1,2-dodecanediol, 2-butyl-2-ethyl-1,3-propanediol, and hydrogenated fatty acid dimer diol. However, essentially any branched diol known can be used, or as a mixture of two or more thereof.

As used herein, "dialkylene glycol" refers to dihydroxyl ethers resulting from dimerization of the linear aliphatic glycols described herein. Dialkylene glycol components of the copolymer can be added to the polymerizations as monomers, but may be generated in situ by dimerization of the linear glycol components under the conditions required for polymerization. For example, polymerizations involving 1,3-propanediol may form the dimer "dipropylene glycol." Methods to control the dimerization of the linear glycols include monomer selection such as choice between dicarboxylic acids and their derivatives or inclusion of sulfonated monomers, catalyst selection, catalyst amount, inclusion of strong protonic acids, addition of basic compounds such as tetramethylammonium hydroxide, addition of buffer compounds such as sodium acetate, and other process conditions such as temperatures and residence times. The dialkylene glycol component may be present in an amount from 0 to 4 mole percent based on 100 mole percent total glycol component. When present, the dialkylene glycol component is present from about 0.1 mole percent to 4 percent, based on 100 mole percent total glycol component, or from about 0.1 mole percent to 2 mole percent, typically from about 0.1 mole percent to about 1 mole percent, and more typically from about 0.2 mole percent to 0.7 mole percent.

Branched hydroxy-carboxylic acid components that are optionally used in the aliphatic-aromatic copolyesters disclosed herein include branch- and hydroxy-substituted aliphatic carboxylic acids and their lactones, lactides, bis(glycolates), and lower alkyl esters having a total of from 4 to 30 carbon atoms. Specific examples include 2-hydroxybutanoic acid, 2-hydroxycaproic acid, 2-hydroxycapric acid, 2-hydroxystearic acid, 12-hydroxystearic acid, (9Z)-12-hydroxy-9-octadecenoic acid (12-hydroxyoleic acid), (9Z,12R)-12-hydroxy-9-octadecenoic acid (ricinoleic acid), 14-hydroxyeicosanoic acid, (S)-2-hydroxyeicosanoic acid ((S)-α-hydroxyarachidic acid), and (11Z,14R)-14-hydroxy-11-eicosenoic acid (lesquerolic acid). Preferably, the branched hydroxy-carboxylic acid components are derived from a renewable biological source, in particular 12-hydroxystearic acid.

At least one of the optional comonomers, the additional glycol component is selected from the group consisting of an alicyclic glycol component and a branched glycol component, must be present in the aliphatic-aromatic copolyesters described herein, such that the total amount of optional comonomer(s) is at least 2 mole percent. In many cases, only one of the comonomers, the additional glycol component is selected from the group consisting of an alicyclic glycol component and a branched glycol component, is present in the copolyester. Furthermore, in may cases only one of the optional comonomers, the second aromatic dicarboxylic acid component other than a terephthalic acid component, the alicyclic dicarboxylic acid component, the branched dicarboxylic acid component, the alicyclic glycol component, and the branched glycol component, is present in the copolyester. For example, the copolymer may comprise from 2 to 30 mole percent of a second aromatic dicarboxylic acid other than a terephthalic acid component (the second aromatic dicarboxylic acid component other than a terephthalic acid component.) Preferably, the second aromatic dicarboxylic acid component is provided by phthalic acid or an ester-forming derivative thereof, such as phthalic anhydride or lower alkyl diesters of phthalic acid.

When a second aromatic dicarboxylic acid is included in the copolyester, the acid component may comprise between about 80 and 40 mole percent of a terephthalic acid component based on 100 mole percent total acid component, between about 10 and 60 mole percent of a linear aliphatic dicarboxylic acid component based on 100 mole percent of total acid component, and between about 2 and 30 mole percent of a second aromatic dicarboxylic acid component based on 100 mole percent of total acid component. Additionally, the glycol component consists essentially of about 100 to 96 mole percent of a linear glycol component based on 100 mole percent total glycol component, and about 0 to 4 mole percent of a dialkylene glycol component based on 100 mole percent total glycol component.

The acid component may comprise between about 69 and 46 mole percent of a terephthalic acid component based on 100 mole percent total acid component, between about 26 and 49 mole percent of a linear aliphatic dicarboxylic acid component based on 100 mole percent of total acid component, and between about 4 and 19 mole percent of a second aromatic dicarboxylic acid component based on 100 mole percent of total acid component.

The acid component may comprise between about 59 and 51 mole percent of a terephthalic acid component based on 100 mole percent total acid component, between about 34 and 44 mole percent of a linear aliphatic dicarboxylic acid component based on 100 mole percent of total acid component, and between about 6 and 14 mole percent of a second aromatic dicarboxylic acid component based on 100 mole percent of total acid component.

The ratio of the mole percent of the second aromatic dicarboxylic acid to terephthalic acid may be less than about 3:4, less than about 19:46, less than about 14:51 or less than about 19:81.

The ratio of the mole percent of the second aromatic dicarboxylic acid to terephthalic acid may be greater than about 1:20, greater than about 2:23, greater than about 6:51 or greater than about 5:26.

The ratio of the combined mole percents of all aromatic dicarboxylic acids to all linear aliphatic dicarboxylic acids may be greater than 2:3, greater than 51:49, greater than 56:44 or greater than 61:39.

In other cases, the copolymer may include alicyclic dicarboxylic acids and/or alicyclic glycols. When these components are included in the copolymer, the dicarboxylic acid component consists essentially of about 70 to 50 mole percent of the terephthalic acid component, about 20 to 50 mole percent of the linear aliphatic dicarboxylic acid component, and about 0 to 30 mole percent of the alicyclic dicarboxylic acid component. In addition, the glycol component consists essentially of about 100 to 70 mole percent of the linear glycol component, about 0 to 4 mole percent of the dialkylene glycol component, and about 0 to 30 mole percent of the alicyclic glycol component.

Alternatively, the dicarboxylic acid component may consist essentially of about 60 to 55 mole percent of the terephthalic acid component, about 30 to 40 mole percent of the linear aliphatic dicarboxylic acid component, and about 0 to 20 mole percent of the alicyclic dicarboxylic acid component. In addition, the glycol component consists essentially of about 100 to 85 mole percent of the linear glycol component, about 0 to 4 mole percent of the dialkylene glycol component, and about 0 to 15 mole percent of the alicyclic glycol component.

Either the alicyclic dicarboxylic acid component or the alicyclic glycol component may be solely present in at least about 6 mole percent.

In other cases, the copolymer may include branched dicarboxylic acids and/or branched glycols. When these components are included in the copolymer, the dicarboxylic acid component may consist essentially of about 70 to 50 mole percent of the terephthalic acid component, about 20 to 50 mole percent of the linear aliphatic dicarboxylic acid component, and about 0 to 30 mole percent of the branched dicarboxylic acid component. In addition, the glycol component may consist essentially of about 100 to 70 mole percent of the linear glycol component, about 0 to 4 mole percent of the dialkylene glycol component, and about 0 to 30 mole percent of the branched glycol component. The branched hydroxy-carboxylic acid component is still optional at 0 to 30 mole percent based on the total dicarboxylic acid component, and either the branched dicarboxylic acid component, the branched glycol component, or the branched hydroxy-carboxylic acid component may be solely present in at least about 6 mole percent.

The optional branched hydroxy-carboxylic acid component may be omitted from the composition, in which case, the dicarboxylic acid component may consist essentially of about 60 to 52 mole percent of the terephthalic acid component, about 32 to 40 mole percent of the linear aliphatic dicarboxylic acid component, and about 0 to 16 mole percent of the branched dicarboxylic acid component. The glycol component may consist essentially of about 100 to 84 mole percent of the linear glycol component, about 0 to 4 mole percent of the dialkylene glycol component, and about 0 to 16 mole percent of the branched glycol component. Either the branched dicarboxylic acid component or the branched glycol component may be solely present in at least about 6 mole percent.

In other cases, the branched dicarboxylic acid component and the branched glycol component may be omitted from the composition, in which case the dicarboxylic acid component consists essentially of about 100 to 70 mole percent of the terephthalic acid component and about 0 to 30 mole percent of the linear aliphatic dicarboxylic acid component; the glycol component may consist essentially of about 100 to 96 mole percent of the linear glycol component and about 0 to 4 mole percent of the dialkylene glycol component, and the branched hydroxy-carboxylic acid component is present in about 30 to 150 mole percent.

The aliphatic-aromatic copolyesters may be polymerized from the disclosed monomers by any process known for the preparation of polyesters. Such processes can be operated in either a batch, semi-batch, or in a continuous mode using suitable reactor configurations. For example, the copolyester may be prepared according to methods described in International Application Numbers PCT/US09/67831, PCT/US09/67838 and PCT/US09/67850, PCT/US09/67863 and PCT/US09/67875 and US Patent Application Publication 2009/0123767.

Of note are copolyesters comprising copolymerized terephthalic acid (or derivatives), sebacic acid (or derivatives), phthalic acid (or derivatives including phthalic anhydride) and 1,3-propanediol (designated herein as 3GTSebP copolyesters). As discussed above, these copolyesters may also comprise a dialkylene glycol component resulting from dimerization of the 1,3-propanediol during copolymerization.

Desirably, the aliphatic-aromatic copolyesters have sufficiently high molecular weights to provide suitable melt viscosity for processing into shaped articles, and useful levels of mechanical properties in said articles. Weight average molecular weights (Mw) from about 20,000 g/mol to about 150,000 g/mol may be useful, for example from about 50,000 g/mol to about 130,000 g/mol or from about 80,000 g/mol to about 110,000 g/mol. In practical terms, molecular weights are often correlated to solution viscosities, such as intrinsic or inherent viscosity. While the exact correlation depends on the composition of a given copolymer, the molecular weights above generally correspond to intrinsic viscosity (IV) values from about 0.5 dL/g to about 2.0 dL/g. More typical are IV values from about 1.0 dL/g to about 1.8 dL/g. Most typical are IV values from about 1.3 dL/g to about 1.6 dL/g.

Although the copolyesters prepared by the processes disclosed in references above reach satisfactory molecular weights, it can be expedient to use chain extenders to rapidly increase the molecular weights and minimize their thermal history while reducing the temperature and contact time of the interchange and polycondensation steps of the process. Suitable chain extenders include diisocyanates, polyisocyanates, dianhydrides, diepoxides, polyepoxides, bis-oxazolines, carbodiimides, and divinyl ethers, which can be added at the end of the polycondensation step, during processing on mechanical extrusion equipment, or during processing of the copolyesters into desired shaped articles. Specific examples of desirable chain extenders include hexamethylene diisocyanate, 4,4'-methylenebis(phenylisocyanate) (also known as methylene-diphenyl diisocyanate or MDI), and pyromellitic dianhydride. Such chain extenders are typically used at 0.1 to 2 weight percent with respect to the copolyesters.

The molecular weights of the aliphatic-aromatic copolyesters can also be increased by post-polymerization processes, such as solid-phase polymerization and vacuum extrusion, both of which are described in greater detail in the references above.

Alternatively, the melt viscosity can be increased by incorporating a branching agent into the copolyesters during polymerization to introduce long-chain branches. Suitable branching agents and their use are described in the references above.

Additionally, the thermal behavior of the copolyesters can be adjusted somewhat by incorporating nucleating agents during polymerization or processing of the copolyesters to accelerate their crystallization rates and provide a more uniform distribution of crystallites throughout the bulk of the polymer. Suitable nucleating agents and their use are described in the references above.

Starch

The first non-synthetic polymer component of the blended composition is starch. As used herein, the term "starch" unless otherwise specified includes any of the various starches described below. Any starch, including those described below, is suitable for use as the first additive component of the copolyester/starch blend composition.

Starch is a polysaccharide carbohydrate consisting of a large number of glucose units joined together by glycosidic bonds produced by essentially any green plant. Commercial sources of starch include but are not limited to cereal grains or root crops such as wheat, corn, rice, oat, arrowroot, pea and potato. Starch consists of two fractions: amylose, having a linear and helical molecular morphology, and amylopectin, having a branched morphology. Depending on the plant, naturally-occurring starch from plant sources generally contains 20 to 25% amylose and 75 to 80% amylopectin.

Examples of commercially available natural starches include native common corn starch, available as Cargill Native Gel 03420 from Cargill, Inc., Cedar Rapids, Iowa and hydrolyzed potato starch, available as PENBIND® 800 starch from Penford Food Ingredients, Centennial, Colo.

As described in greater detail in U.S. Pat. Nos. 5,043,196 and 5,314,754 various corn hybrids have been developed that provide starches of high amylose content and which have been available commercially since about 1963. As used herein "high amylose starch" refers to any starch with an amylose content of at least 45% and preferably at least 65% by weight. U.S. Pat. No. 5,374,304 discloses specialty amyloses obtained by treatment of high amylose starches with formamide solution with a small proportion of dichloroacetic acid. Additionally, high amylose starch can be obtained by separation or isolation such as by the fractionation of a native starch material or by blending isolated amylose with a native starch.

Starch can also be derivatized or modified by typical processes known in the art, e.g., esterification, etherification, oxidation, acid hydrolysis, crosslinking and enzyme conversion. Modified starches include esters, such as the acetate and the half-esters of dicarboxylic acids, particularly the alkenylsuccinic acids; ethers, such as the hydroxyethyl- and hydroxypropyl starches and starches reacted with hydrophobic cationic epoxides; starches oxidized with hypochlorite; starches reacted with cross-linking agents such as phosphorus oxychloride, epichlorohydrin, phosphate derivatives prepared by reaction with sodium or potassium orthophosphate or tripolyphosphate (phosphate starches) and combinations thereof. Other starch derivatives include thermoplastic starch, cationic starch, anionic starch, alkyl starches, amine starches and dialdehyde starches. Anhydrides such as maleic, phthalic, or octenyl succinic anhydride can also be used to produce ester derivatives. These and other conventional modifications of starch are described in publications such as "Starch: Chemistry and Technology", Second Edition, edited by Roy L. Whistler et al. Chapter X; Starch Derivatives: Production and Uses by M. W. Rutenberg et al., Academic Press, Inc., 1984. These processes can be used to modify any starch, including high amylose starches. Thermoplastic starch can be produced, for example, as disclosed in U.S. Pat. No. 5,362,777. Combinations of the various starches and starch derivatives listed above may also be used.

One modification of note is etherification with alkylene oxides, particularly those containing 2 to 6, preferably 2 to 4, carbon atoms. Ethylene oxide, propylene oxide and butylene oxide are exemplary compounds useful in etherifying the starting starch materials. Propylene oxide is preferred, providing "hydroxypropylated" starches. Other substituents can be hydroxyethyl or hydroxybutyl to form hydroxyether substitutions. U.S. Pat. Nos. 5,043,196; 5,314,754 and 7,326,743 describe various modified high amylose starches. The degree of substitution (the average number of hydroxyl groups in a unit that are substituted) for any of these modifications may be 0.05 to 2.

Mixtures of unmodified or modified starch can be used as the starch component of the composition. Any mixture may be used, such as from 5 to 95 weight % of modified starch in the starch component. The upper limit to the content of the modified starch may be determined largely by its cost. Hydroxypropylated amylose is a useful modified starch. Notable starches include high amylose maize starch, and hydroxypropylated high amylose starch.

Unmodified starches and starches other than hydroxypropylated high amylose starch are also useful.

Another starch that may be used is ReNew® 400 resin, available from StarchTech, Inc, Golden Valley, Minn., and is comprised of starch and optionally biodegradable polymers. The starch used is an unmodified industrial grade starch, typically from wheat, corn, and/or potato. ReNew® 400 resin is certified to meet EN 13432, which means that a biodegradation level of at least 90% is reached in less than 6 months under controlled composting conditions. While the composition of ReNew® 400 is a trade secret, it is known from U.S. Pat. No. 5,095,054 that biodegradable loose-fill resins have improved properties when they contain a substantially water-insoluble thermoplastic polymer. Extraction of ReNew® 400 with toluene solvent yielded about 2 weight % on a dry basis of substantially water-insoluble thermoplastic polymer(s).

Water and Polyol Plasticizers

Water "gelatinizes" (a process also known as destructuring or melting) the starch to form a polymeric gel structure. In order to provide appropriate starch gelatinization, high water levels are used. Once gelatinized, excess water can be removed from the starch composition by drying the composition to reach relatively low water levels before the starch is further processed into the copolyester/starch blend. Water may also act as a plasticizer in that it softens the material or reduces the modulus. The rheology of the composition is strongly influenced by the presence of water. High water content of the composition, such as above 10 weight % of added water, results in relatively low viscosity. A low water content, such as 0.5 weight % of added water, results in much higher viscosity of the composition.

It is desirable that the total moisture content of the starch-containing composition be at a level of 25% or less by weight. By total moisture or water content is meant both the residual moisture of the starch (that is the amount absorbed while stored at ambient conditions) and the amount of water fed to the polymer processing equipment, e.g. an extruder. Typically, starch may contain about 9 to 12% residual moisture before drying. "Pre-gelatinized" starch may have about 6 weight % water or less after drying. Enough water must be present to allow the material to be processed, for example mixing and heating to the desired temperatures. While some water may be added to the extruder, only an amount which will bring the total moisture level to 25% or less can be added. Accordingly, while the total moisture content that is used for carrying out the invention may vary somewhat, depending on the actual material used and other process variations, a range of added water from about 0.05 to 10%, preferably from about 1 to 10% and more preferably from about 1 to 7% by weight of total composition, will generally be suitable. The amount of water in the final composition or articles prepared therefrom may also be influenced by volatilization of water during processing of the copolyester/starch blend.

Another non-polymeric component of the composition is a polyol plasticizer. Suitable polyol plasticizers include organic compounds containing more than one hydroxyl group per molecule or derivatives thereof. Derivatives of the polyols include esters such as acetates. Preferred polyol plasticizers have a molecular weight in the range of 50-6000, more preferably 50-2500, and still more preferably 100-400. They are preferably selected from the group consisting of sorbitol, glycerol (also known as glycerin), maltitol, xylitol, mannitol, erythritol, di- or polyglycerol, glycerol mono- and diesters of fatty acids, glycerol acetates such as glycerol mono- or diacetate, polyethylene oxide, ethylene glycol, diethylene glycol or polyethylene glycol, trimethylolpropane, pentaerythritol; more preferably glycerol, maltitol, sorbitol, erythritol and/or xylitol. Other plasticizers which may be used include invert sugar and corn syrup.

The polyol plasticizers have a range of molecular sizes and weights that allow for different degrees of association with starch. Higher molecular weight plasticizers such as maltitol increase the modulus of the composition, while low molecular weight plasticizers such as glycerol are very volatile and may be lost during drying or processing of the composition. Mixtures of plasticizers may be desirable since a high level of a single plasticizer may result in incomplete mixing with the starch. Useful mixtures of plasticizers include a mixture of at least two plasticizers selected from the group consisting of glycerol, maltitol, sorbitol, erythritol and xylitol, such as a mixture of sorbitol, maltitol and glycerol, and a mixture of sorbitol, xylitol and glycerol. Another useful combination includes water and glycerin, such as a combination, by weight, of about 6 parts of glycerin and 4 parts of water.

U.S. Pat. No. 5,374,304 discloses compositions of specialty high amylose starch and a glycerol plasticizer. U.S. Pat. Nos. 5,314,754 and 7,326,743 describe various modified high amylase starches in compositions with water and polyol plasticizers such as glycerol. These compositions may be blended with the copolyester without the addition of additional water or plasticizer.

The compositions may further comprise small amounts of optional materials commonly used and well known in the polymer art, such as disclosed in WO2008/014573. Such materials include lubricants, emulsifiers and antioxidants.

Lubricants include one or more fatty acids and fatty acid salts. The fatty acids include saturated (preferably saturated) or unsaturated monobasic carboxylic acids. Monobasic carboxylic acids include acids having only one carboxylic acid moiety. Particularly useful fatty acids include $C_4$ to less than $C_{36}$ (e.g., $C_{34}$), more particularly $C_6$ to $C_{26}$, and even more particularly $C_6$-$C_{22}$ acids. Specific organic acids include, but are not limited to, lauric acid, myristic acid, palmitic acid, stearic acid, behenic acid, erucic acid, montanic acid, oleic acid, and linoleic acid. Saturated acids are preferred. Salts of the fatty acids include sodium, potassium and calcium salts such as calcium stearate, sodium montanate, sodium stearate and potassium stearate. The amount of fatty acid and/or fatty acid salt may be from 0.1-5.0 parts, preferably 0.2 to 3 parts per hundred parts of the composition (i.e. copolyester, starch, water and polyol plasticizer). Other lubricants include amides of fatty acids such as erucamide.

Emulsifiers include those wherein the hydrophilic lipophilic balance (HLB) is between 1 and 22. Emulsifiers include propylene glycol monostearate, glycerol monooleate, glycerol monostearate, acetylated monoglycerides (stearate), sorbitan monooleate, propylene glycol monolaurate, sorbitan monostearate, calcium stearoxyl-2-lactylate, glycerol monolaurate, sorbitan monopalmitate, soy lecithin, diacetylated tartaric acid esters of monoglycerides, sodium stearoyl lactylate, and sorbitan monolaurate. Emulsifiers may be present at a level of from 0.2 to 3 parts per hundred parts of the composition and act to stabilize mechanical properties and increase homogeneity of the blend. They may also provide a defoaming effects and antiretrodegradation effects. Glycerol monostearate (for example at 1 to 1.5 parts per hundred parts composition) and sodium stearoyl lactylate (for example at 0.25 to 1.5 parts per hundred parts composition) and combinations thereof are notable.

Primary and secondary antioxidants include butylated phenol derivatives such as for example IRGANOX® 1010, phosphites such as IRGAFOS® 168, sulfating agents such as sulfur dioxide, sodium sulfite, sodium and potassium bisulfites and metabisulfites, citric acid, optionally combined with ascorbic acid or sodium bisulfite and tocopherol. Antioxidants may be included at up to about 2 parts per hundred parts composition.

Other additives include stabilizers including viscosity stabilizers, heat stabilizers, and hydrolytic stabilizers, ultraviolet ray absorbers and stabilizers, compatiblizers, anti-static agents, and fire-retardants. Such additives also include flow enhancers, slip agents, rheology modifiers, tougheners, pigments, antiblocking agents, inorganic and organic fillers, such as silica, clay, talc, chalk, titanium dioxide, carbon black, wood flour, keratin, chitin, refined feathers and reinforcing fibers, such as glass fibers and natural fibers like paper, jute and hemp. Any of these additives may be added individually or in combination to the copolyester/starch blend composition. Many such additives are described in the *Kirk Othmer Encyclopedia of Chemical Technology*, 5$^{th}$ edition, John Wiley & Sons (Hoboken, 2005). The additives are preferably nontoxic, biodegradable, and derived from renewable biological sources. These conventional ingredients may be present in the compositions in quantities that are generally from 0.01 to 5 parts per hundred parts composition, so long as they do not detract from the basic and novel characteristics of the composition and do not significantly adversely affect the performance of the material prepared from the composition.

The aliphatic-aromatic copolyester/starch blends can be used to make a wide variety of shaped articles. Shaped articles include films, sheets, fibers, filaments, bags, melt blown containers, molded parts such as cutlery, coatings, polymeric melt extrusion coatings on substrates, polymeric solution coatings onto substrates, laminates, and bicomponent, multilayer, and foamed varieties of such shaped articles. The aliphatic-aromatic copolyester/starch blends are useful in making any shaped article that can be made from a polymer. The aliphatic-aromatic copolyester/starch blends can be formed into such shaped articles using any known process, including thermoplastic processes such as compression molding, thermoforming, extrusion, coextrusion, injection molding, blow molding, melt spinning, film casting, film blowing, lamination, foaming using gases or chemical foaming agents, or any suitable combination thereof to prepare the desired shaped article.

Shaped articles, particularly those that find use in packaging, including films, bags, containers, cups, and trays among others, are typically desired to be compostable. The current standards for compostable packaging and packaging materials are described in ASTM D6400-04 and EN 13432:2000. As the more stringent standard, EN 13432 is more pertinent for the qualification of new compostable packaging materials. To qualify as compostable, the packaging must disintegrate in 3 months under the conditions of an industrial composting facility and biodegrade to carbon dioxide at the level of 90% in 6 months without any negative impact due to toxicity on the composting process or on plant growth using the resulting compost. In this regard, the aliphatic-aromatic copolyesters disclosed herein can be said to be biodegradable when their shaped articles used as packaging materials, such as films, are shown to be compostable. The shaped articles may comprise films that are compostable at thicknesses of up to 20 microns, or up to 70 microns, or up to 120 microns, or greater than 120 microns.

The aliphatic-aromatic copolyester/starch blends described herein are particularly well suited for the extrusion and blowing of compostable films with high tear strength.

Accordingly, the invention also provides a method for preparing a film comprising the copolyester described above; the method comprising melt blending the copolyester with starch, optionally water and polyol plasticizer to provide a blended composition and preparing a film comprising the blended composition by, for example, blown film extrusion wherein the film comprising the blended composition has a tear strength measured in the machine direction at least 3 times greater, or at least 4 times greater, or at least 9 times greater, than the tear strength measured in the machine direction of a film comprising a composition made from the copolyester.

The magnitude of improvement in tear strength when using the copolyester/starch blend described herein is surprising compared to the improvement in tear strength observed when starch blends with other copolyesters are used to prepare films.

Films are commonly tested for tear strength according to the Elmendorf method as described in ASTM D1922-09. In typical applications for films or articles prepared from films such as bags, the tear strength must be at least 1000 g/mm, but higher values, such as those greater than 5000 g/mm are desirable as they allow a thinner gauge to be used. Values greater than 8000 g/mm, 10,000 g/mm, 12,000 g/mm, 15,000 g/mm, 16,000 g/mm or even 20,000 g/mm can provide additional benefits when balanced with other properties desired for a given application. The aliphatic-aromatic copolyester/starch blends provide films that can attain these levels of tear strength and that show enhancement in tear strength when compared to prior art copolyesters with similar terephthalic acid contents. The enhancement is particularly apparent when the linear glycol is 1,3-propanediol. Hence, the enhancement in tear strength can be reasonably expected to be apparent when other linear glycols are used.

Notably a film comprising the blended composition has a tear strength measured in the machine direction at least 3 times greater, or at least 4 times greater, or at least 9 times greater, than the tear strength measured in the machine direction of a film comprising a composition comprising the copolyester that does not comprise the starch, water and polyol plasticizer.

The invention is illustrated by the following embodiments.

EXAMPLES

Materials

S-1: native common corn starch, available as Cargill Native Gel 03420 from Cargill, Inc., Cedar Rapids, Iowa.
PBAT-1: a copolymer of 1,4-butanediol, terephthalic acid and adipic acid, commercially available under the tradename ECOFLEX® FBX 7011 from BASF.

Examples of the 3GTSebP copolyester compositions were described below. Copolyesters 3GTSebP-1, 3GTSebP-2, and 3GTSebP-3 were first synthesized in a batch process using 1,3-propanediol, dimethyl terephthalate, sebacic acid, phthalic anhydride, and sodium acetate trihydrate (300 ppm Na) according to procedures described in International Application Numbers PCT/US09/67838 and PCT/US09/67875 75. Similar batches of each copolyester composition were then dry blended to give the average compositions shown in Table 1. For the copolyesters with an IV of about 1.1 dL/g, the IV was raised to approximately 1.5 dL/g by a reaction extrusion process conducted on an 18 mm or 30 mm twin screw extruder. Barrel temperature set points were 160° C. Methylene-diphenyl diisocyanate (MDI) was added to the polymer and introduced into the feed hopper of the extruder. MDI ranged from 0.3 to 0.5 wt %. The polymer feed rates were 2 and 35 lb/hr for the 18 and 30 mm twin screw extruders, respectively. Care was taken to keep the MDI dry before and as it was entering the extruder. Copolyesters 3GTSebP-4 to 3GTSebP-7 in Table 1 were synthesized in a similar manner by loading the indicated mole percentages of the monomers and sodium acetate trihydrate (300 ppm Na) to the batch process (small amounts of dipropylene glycol may be formed during copolymerization, but are not listed) and then processed by reactive extrusion to raise their IV to about 1.5 dL/g. All units, unless otherwise indicated, were mole %.

TABLE 1

| Copolymer | 1,3-Propanediol | Terephthalic acid | Sebacic acid | Phthalic anhydride | Dipropylene glycol | IV (dL/g) |
|---|---|---|---|---|---|---|
| 3GTSebP-1 | 49.7 | 26.8 | 17.4 | 5.8 | 0.3 | 1.4 |
| 3GTSebP-2 | 49.7 | 28.2 | 19.2 | 2.7 | 0.2 | 1.1 |
| 3GTSebP-3 | 49.6 | 27.4 | 17.3 | 5.4 | 0.3 | 1.1 |
| 3GTSebP-4 | 50 | 25 | 19 | 6 | | |
| 3GTSebP-5 | 50 | 26.5 | 17.5 | 6 | | |
| 3GTSebP-6 | 50 | 26 | 20 | 4 | | |
| 3GTSebP-7 | 50 | 26 | 18 | 6 | | |

Copolyester/starch blends were prepared from copolyesters 3GTSebP-1 to 3GTSebP-3 using a 30 mm twin screw extruder with length to diameter ratio of 43. The polyester and starch were fed into a common feed hopper and the water and glycerol were first mixed and fed just downstream of the polymer and starch addition to prevent agglomeration of the starch and polymer in the feed hopper. Temperature profiles along the barrel were 80, 130, 135 and 150° C. Residence time was 90 seconds or greater to ensure "cooking" of the starch. The screw speed was 300 rpm and feed rate 20 lb/hr. The compositions are summarized in Table 2. A comparative PBAT/starch blend was prepared using commercially available copolyester. Additional copolyester/starch blends were prepared from copolyesters 3GTSebP-4 to 3GTSebP-7 using similar procedures.

TABLE 2

| Composition | C1 | 1 | 2 | 3 |
|---|---|---|---|---|
| Type | blend | blend | blend | blend |
| Copolyester | PBAT-1 | 3GTSebP-1 | 3GTSebP-3 | 3GTSebP-2 |
| (wt %) | 60 | 60 | 60 | 60 |
| Starch (wt %) | 30 | 30 | 30 | 30 |
| Water (wt %) | 4 | 4 | 4 | 4 |
| Glycerol (wt %) | 6 | 6 | 6 | 6 |

Blown films about 2-mil thick were prepared from the neat and starch blend compositions summarized in Tables 1 and 2 on a 0.75-inch-diameter Brabender extruder with a 1-inch-diameter annular blown film die with an air ring cooling system. The die gap was 40 mils. The blowup ratio (ratio of final film diameter to die diameter was 2:1. Haul-off speed was 6 ft/min. Temperatures along the barrel ranged from 145 to 175° C., depending on the polymer composition.

Samples were prepared from the blown films and tested for Elmendorf tear resistance according to ASTM D1922 and tensile properties according to ASTM D882.

The invention claimed is:
1. A composition comprising, based on the weight of the composition, 40 to 70 weight % of an aliphatic-aromatic copolyester, 20 to 50 weight % of starch, 5 to 10 weight % of polyol plasticizer, and 0 to 10 weight % of water wherein
the copolyester comprises a dicarboxylic acid component and a glycol component;
the dicarboxylic acid component comprises, based on 100 mole % total acid component, about 80 to 40 mole % of a first aromatic dicarboxylic acid consisting essentially of a terephthalic acid component, about 10 to 60 mole percent of a linear aliphatic dicarboxylic acid component; and 0 to 30 mole percent of an additional dicarboxylic acid component;
the additional dicarboxylic acid is selected from the group consisting of a second aromatic dicarboxylic acid, an alicyclic dicarboxylic acid, a branched dicarboxylic acid component, and combinations of two or more thereof;
the glycol component consists essentially of, based on 100 mole percent total glycol component, about 100 to 60 mole percent of a linear aliphatic glycol component, 0 to about 4 mole percent of a dialkylene glycol component; and 0 to 40 mole percent of an additional glycol;

the additional glycol component is selected from the group consisting of an alicyclic glycol component and a branched glycol component;

the additional dicarboxylic acid component, the additional glycol component, and the branched hydroxy-carboxylic acid component is at least 2 mole % of the copolyester; and a film prepared from the composition has a tear strength measured in the machine direction at least 3 times greater than the tear strength measured in the machine direction of a film made from the copolyester.

2. The composition of claim 1 wherein the aliphatic glycol component is 1,3-propanediol or 1,4-butanediol.

3. The composition of claim 1 wherein the aliphatic dicarboxylic acid component is azelaic acid, sebacic acid, brassylic acid, azelaic acid alkyl ester, sebacic acid alkyl ester, brassylic acid alkyl ester, or combinations of two or more thereof.

4. The composition of claim 1 wherein the aliphatic glycol component is 1,2-ethanediol, 1,3-propanediol, 1,4-butanediol, or combinations of two or more thereof.

5. The composition of claim 4 wherein the dicarboxylic acid component consists essentially of, based on 100 mole % total acid component, about 80 to 40 mole % of the first aromatic dicarboxylic acid, about 10 to 60 mole percent of the aliphatic dicarboxylic acid component; and 2 to 30 mole percent the additional dicarboxylic acid component.

6. The composition of claim 5 wherein the additional dicarboxylic acid is a phthalic acid.

7. The composition of claim 6 wherein the aliphatic dicarboxylic acid component is sebacic acid.

8. The composition of claim 7 wherein the aliphatic glycol component comprises 1,3-propanediol.

9. The composition of claim 4 wherein the copolyester comprises copolymerized repeat units of a terephthalic acid or derivative, a sebacic acid or derivative, a phthalic acid derivative, and 1,3-propanediol.

10. The composition of claim 9 wherein the copolyester is semicrystalline.

11. The composition of claim 1 wherein the aliphatic glycol component is 1,3-propanediol.

12. The composition of claim 11 wherein the aliphatic dicarboxylic acid is sebacic acid or sebacic acid alkyl ester.

13. An article comprising a composition wherein the article is a film, a sheet, a fiber, a melt blown container, a molded part, or a foamed part; and the composition is as recited in claim 1.

14. The article of claim 13 wherein the article is the film.

15. The shaped article of claim 14 wherein the tear strength of the film measured in the machine direction is at least 4 times greater than the tear strength measured in the machine direction of a film made from the copolyester.

16. The shaped article of claim 14 wherein the tear strength of the film measured in the machine direction is at least 9 times greater than the tear strength measured.

* * * * *